United States Patent
Brooks et al.

(10) Patent No.: US 10,653,128 B2
(45) Date of Patent: May 19, 2020

(54) SPRAY SYSTEM FOR A SELF-PROPELLED AGRICULTURAL MACHINE HAVING ADJUSTABLE TREAD WIDTH AND REAR WHEEL NOZZLES

(71) Applicant: CNH Industrial America LLC, New Holland, PA (US)

(72) Inventors: Nathan P. Brooks, Manitowoc, WI (US); Steven N. Winkel, Kiel, WI (US); Blaine A. Schwalbe, Valders, WI (US)

(73) Assignee: CNH Industrial America LLC, New Holland, PA (US)

( * ) Notice: Subject to any disclaimer, the term of this patent is extended or adjusted under 35 U.S.C. 154(b) by 231 days.

(21) Appl. No.: 15/684,512

(22) Filed: Aug. 23, 2017

(65) Prior Publication Data

US 2019/0059351 A1    Feb. 28, 2019

(51) Int. Cl.
*A01M 7/00*    (2006.01)
*A01C 21/00*    (2006.01)
(Continued)

(52) U.S. Cl.
CPC ......... *A01M 7/0089* (2013.01); *A01C 21/002* (2013.01); *A01C 21/005* (2013.01);
(Continued)

(58) Field of Classification Search
CPC . A01M 7/0089; A01M 7/0057; A01C 21/005; A01C 21/002; A01C 23/007;
(Continued)

(56) References Cited

U.S. PATENT DOCUMENTS 4,266,489 A * 5/1981 Parramore ......... B62D 49/0607
                                                                  111/141
4,427,154 A * 1/1984 Mercil ....................... B05B 3/18
                                                                  239/161
(Continued)

FOREIGN PATENT DOCUMENTS

EP           0623278 A1    11/1994
JP         11225650 A  *    8/1999
(Continued)

OTHER PUBLICATIONS

Dai et al., partial translation of CN206284203 U (Jun. 30, 2017).*
(Continued)

*Primary Examiner* — M. N. Von Buhr
(74) *Attorney, Agent, or Firm* — Rebecca L. Henkel; Rickard K. DeMillle

(57) ABSTRACT

A self-propelled agricultural sprayer can be configured with a spray boom, adjustable width wheels and rear wheel spray nozzles arranged over rear wheels of the adjustable width wheels, so that the rear wheel nozzles ensure proper coverage of an agricultural field behind the rear wheels according to location. A control system can determine front wheel nozzles disposed on the spray boom that are counterpart spray nozzles to the rear wheel nozzles based on a width of the wheels, and implement activation/deactivation states of the rear wheel nozzles based on the counterpart front spray nozzles. The activation/deactivation states of the spray nozzles can be determined by geographic location of the machine using a UPS location. The rear wheel nozzles can be arranged with respect to fenders of the rear wheels, so that the rear wheel nozzles move laterally with the rear wheels.

20 Claims, 3 Drawing Sheets

(51) Int. Cl.
 *B05B 12/12* (2006.01)
 *B05B 1/20* (2006.01)
 *B62D 49/06* (2006.01)
 *A01C 23/00* (2006.01)
(52) U.S. Cl.
 CPC ............. *A01M 7/0057* (2013.01); *B05B 1/20* (2013.01); *B05B 12/12* (2013.01); *B62D 49/0678* (2013.01); *A01C 23/007* (2013.01); *A01C 23/008* (2013.01)
(58) Field of Classification Search
 CPC ......... A01C 23/008; B05B 1/20; B05B 12/12; B62D 49/0678
 See application file for complete search history.

(56) References Cited

U.S. PATENT DOCUMENTS

| | | | |
|---|---|---|---|
| 4,823,268 A | 4/1989 | Giles et al. | |
| 5,704,546 A | 1/1998 | Henderson et al. | |
| 5,913,915 A * | 6/1999 | McQuinn | A01B 79/005 700/231 |
| 5,971,294 A | 10/1999 | Thompson et al. | |
| 6,122,581 A * | 9/2000 | McQuinn | A01B 79/005 701/468 |
| 6,382,523 B1 | 5/2002 | Hedegard | |
| 6,678,580 B2 | 1/2004 | Benneweis | |
| 7,502,665 B2 | 3/2009 | Giles et al. | |
| 8,191,795 B2 | 6/2012 | Grimm et al. | |
| 8,386,129 B2 | 2/2013 | Collins et al. | |
| 8,488,874 B2 | 7/2013 | Zaman et al. | |
| 8,523,085 B2 * | 9/2013 | Grimm | A01M 7/0089 239/1 |
| 8,550,383 B2 | 10/2013 | McConnell | |
| 8,718,874 B2 * | 5/2014 | McClure | A01B 69/008 701/41 |
| 9,148,995 B2 | 10/2015 | Hrnicek et al. | |
| 9,339,023 B2 | 5/2016 | Ballu | |
| 9,554,506 B2 | 1/2017 | Bittner et al. | |
| 9,907,224 B2 * | 3/2018 | Rosengren | A01C 7/06 |
| RE47,055 E * | 9/2018 | McClure | A01B 69/008 |
| 2007/0267524 A1 | 11/2007 | Mack | |
| 2014/0084081 A1 | 3/2014 | Kunz et al. | |
| 2014/0103138 A1 * | 4/2014 | Hobbs | A01M 7/0042 239/130 |
| 2014/0277959 A1 * | 9/2014 | Wagers | A01C 21/005 701/50 |
| 2014/0361094 A1 * | 12/2014 | Michael | A01C 23/042 239/1 |
| 2016/0113191 A1 * | 4/2016 | Rosengren | A01C 7/06 701/50 |
| 2016/0136671 A1 * | 5/2016 | Kocer | A01C 23/007 700/283 |
| 2016/0227755 A1 | 8/2016 | Preheim et al. | |
| 2016/0281309 A1 | 9/2016 | Wang et al. | |
| 2016/0310978 A1 | 10/2016 | Bittner et al. | |
| 2016/0318550 A1 * | 11/2016 | Brooks | A01C 23/00 |
| 2016/0368011 A1 | 12/2016 | Feldhaus et al. | |
| 2017/0135280 A1 * | 5/2017 | Rosengren | A01C 5/062 |

FOREIGN PATENT DOCUMENTS

| | | | | |
|---|---|---|---|---|
| JP | 11318240 A | * | 11/1999 | |
| JP | 2008295378 A | * | 12/2008 | |
| JP | 2009055847 A | * | 3/2009 | |
| JP | 2009178108 A | * | 8/2009 | |
| JP | 2018183077 A | * | 11/2018 | |
| JP | 2018183079 A | * | 11/2018 | |

OTHER PUBLICATIONS

Zhang, partial translation of CN201379016 Y (Jan. 13, 2010).*
English translation of JP-11318240 (abstract only) (Year: 1999).*
English translation of JP-11225650 (abstract only) (Year: 1999).*
Jim Patrico, Progressive Farmer Senior Editor: Smart Sprayers dated Mar. 21, 2016; https://www.dtnpf.com/agriculture/web/ag/news/equipment-tech/article/2016/03/21/high-tech-features-make-sprayers—(3) pages.

* cited by examiner

SPRAY SYSTEM FOR A SELF-PROPELLED AGRICULTURAL MACHINE HAVING ADJUSTABLE TREAD WIDTH AND REAR WHEEL NOZZLES

FIELD OF THE INVENTION

The invention relates generally to agricultural product application equipment such as self-propelled sprayers and, in particular, to a spray system for a self-propelled sprayer having wheels configured to adjust inwardly and outwardly with respect to the sprayer and rear wheel nozzles arranged with respect to rear wheels of the sprayer so that the rear wheel nozzles can be selectively activated or deactivated according to a location of the sprayer with respect to a Global Positioning System (UPS) location based on aligned front nozzles disposed on a spray boom.

BACKGROUND OF THE INVENTION

High-clearance sprayers are getting larger and more complex, with continued efforts to increase effectiveness of application coverage. Efforts to increase effectiveness of application coverage include providing larger spray booms with sectional or even per-nozzle control. This allows for highly targeted applications, for example, based on prescription mapping or other application plans.

In front boom sprayers, further efforts to increase effectiveness of application coverage include incorporating spray nozzles at the back of the sprayer, such as at the rear fenders. The rear fender nozzles are typically controlled in an on or off manner. However, with the increasing complexity of front boom controls, application through such rear fender nozzles may not correspond to the application plan at the front boom. What is needed is an improved system that eliminates one or more of the foregoing disadvantages.

SUMMARY OF THE INVENTION

A self-propelled agricultural sprayer can be configured with a spray boom, adjustable width wheels and rear wheel spray nozzles arranged over rear wheels of the adjustable width wheels, so that the rear wheel nozzles ensure proper coverage of an agricultural field behind the rear wheels according to location. A control system can determine front wheel nozzles disposed on the spray boom that are counterpart spray nozzles to the rear wheel nozzles based on a width of the wheels, and implement activation/deactivation states of the rear wheel nozzles based on the counterpart front spray nozzles. The activation/deactivation states of the spray nozzles can be determined by geographic location of the machine using a GPS location. The rear wheel nozzles can be arranged with respect to fenders of the rear wheels, so that the rear wheel nozzles move laterally with the rear wheels.

In one aspect of the invention, a control system for a front boom adjustable width sprayer can receive a first input indicating a track width of the sprayer. The first input can be provided manually by an operator or automatically by sensors detecting a state or position of a component that corresponds to a separation distance between the wheels. The control system can also receive a second input from a Global Positioning System (GPS) or other location system indicating a current location for the machine. The control system can also receive a third input indicating a section and/or nozzle configuration of the machine, which can include a specifying the number of nozzles, the separation distances between nozzles, and/or the sectional control provided for the nozzles disposed on the front boom. The control system can utilize a prescription map or other application plan and compare the current location of the machine and, accordingly, the location of particular nozzles and/or sections, to the prescription map or plan for applying product. The control system then activates or deactivates the rear-facing nozzles over the rear wheels depending on the desired activation state of counterpart forward-facing nozzles. In this way, the control system can identify which front boom nozzles are aligned with wheels for a given track width, as track path nozzles, and identify a spray characteristic of the track path nozzles at a given time or location in the field. The control system can control a spray characteristic(s) of the rear nozzles based on the identified spray characteristic(s) of the track path nozzles.

Specifically then, one aspect of the present invention provides a spray system for a self-propelled agricultural machine. The spray system includes: a chassis supported by multiple wheels, in which rear wheels of the multiple wheels are configured to adjust inwardly and outwardly with respect to the chassis to define a variable separation distance between the rear wheels; a spray boom supported by the chassis, the spray boom including multiple spray boom nozzles configured to selectively deliver a liquid product to an agricultural field; multiple rear wheel nozzles arranged with respect to the rear wheels, in which the rear wheel nozzles are configured to selectively deliver a liquid product to an agricultural field in an area behind the rear wheels; and a controller configured to control activation and deactivation of the spray boom nozzles and the rear wheel nozzles. The controller can execute a program stored in a non-transient medium to: (a) load a prescription map indicating areas of an agricultural field for delivering a liquid product; (b) determine a location of the machine with respect to the prescription map; and (c) selectively activate or deactivate spray boom nozzles and rear wheel nozzles according to the location of the machine with respect to the prescription map.

Another aspect of the present invention provides a method for spraying an agricultural field using a self-propelled agricultural machine having a chassis supported by multiple wheels. The method includes: adjusting rear wheels of the multiple wheels inwardly or outwardly with respect to the chassis to define a variable separation distance between the rear wheels; loading a prescription map indicating areas of an agricultural field for delivering a liquid product; determining a location of the machine with respect to the prescription map; selectively activating or deactivating spray boom nozzles arranged with respect to a spray boom supported by the chassis according to the location of the machine with respect to the prescription map, in which the spray boom nozzles are configured to deliver a liquid product to an agricultural field; and selectively activating or deactivating rear wheel nozzles arranged with respect to the rear wheels according to the location of the machine with respect to the prescription map, in which the rear wheel nozzles are configured to deliver a liquid product to an agricultural field in an area behind the rear wheels.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
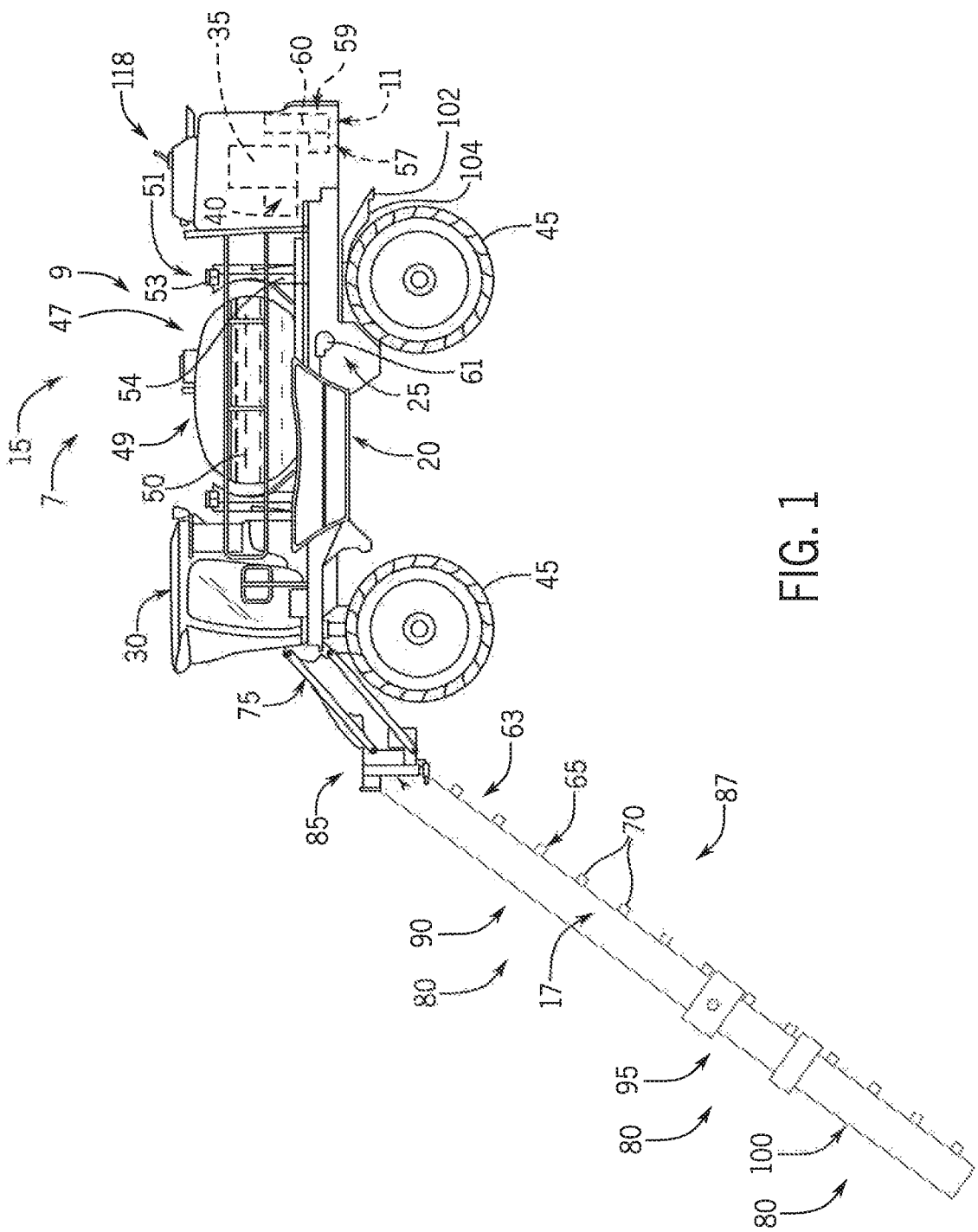
FIG. 1 is a side elevation of a self-propelled sprayer with a spray system according to an aspect of the present invention.

Referring now to the drawings and specifically to FIG. 1, an agricultural sprayer is shown here as a self-propelled agricultural sprayer vehicle or self-propelled sprayer 15 having a spray boom 17, such as those available from CNH Industrial, including the Miller Nitro and Condor Series sprayers and New Holland Guardian Series sprayers. The sprayer 15 includes chassis 20 having chassis frame 25 that supports various assemblies, systems, and components. These various assemblies, systems, and components include cab 30, engine 35, and hydraulic system 40. Hydraulic system 40 receives power from engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings.

In addition, the wheels 45 can be configured to adjust inwardly and outwardly with respect to the chassis 20. The wheels 45 can be adjusted manually or automatically by an operator as desired. This provides an adjustable tread with the sprayer 15, thereby advantageously allowing the sprayer 15 to be customizable with respect to widths of rows of various agricultural fields.

Still referring to FIG. 1, a product system 7 can include a product storage system 47 with a product tank 49 storing an agricultural liquid product 50 on the chassis 20. Product 50 can include any of a variety of agricultural liquid products, such as various pesticides, herbicides, fungicides, liquid fertilizers, and other liquids including liquid suspensions beneficial for application onto agricultural fields by way of boom 17. A rinse system 9 can include a rinse liquid storage system 51 having rinse tank 53 storing a rinse liquid 54 such as water or another suitable rinse liquid. Also, an air purge system 11 can include a compressed air storage system having an air compressor 57 operably connected to air tank 59 that stores air 60 compressed by compressor 57. A flow system is configured to selectively direct liquid product 50, rinse liquid 54, or air 60 through various flow paths defined through the sprayer 15 and boom 17 depending on whether a spraying procedure, a rinsing procedure, or a pneumatic purging or boom blow-out procedure is being performed. During spraying and rinsing procedures, the flow system can energize a pump 61 to convey either liquid product 50 or rinse liquid 54 to the boom 17.

In operation, the pump 61 can push either liquid product 50 or rinse liquid 54 through plumbing components such as interconnected pieces of tubing and through a boom flow system 63 that includes segments of boom tubing 65 for release out of spray boom nozzles 70 that are spaced from each another along the width of the boom 17 during spraying or rinsing operations of sprayer 15 (according to activation/deactivation states which can be implemented, for example, using electronically controlled switches). Accordingly, such plumbing components can connect the product storage system 47, the rinse liquid storage system 51 and the boom 17 via an on-board valve system and boom valve system. With additional reference to FIG. 2, groups or banks of multiple adjacent spray boom nozzles 70 define multiple spray sections 72 of a spray system of sprayer 15. During spraying procedures, spray sections 72 defined along the boom 17 can selectively deliver product 50 for release onto an agricultural field at locations corresponding to positions of activated spray sections 72. The boom 17 is connected to the chassis 20 with a lift arm assembly 75 that is configured to move the boom 17 up and down for adjusting the height of application of the product 50.

The boom 17 can include multiple boom segments 80 connected longitudinally to provide the corresponding width of the assembled boom 17. The boom segments 80 can include center a section 85 and left and right boom arms 87, 89 extending in opposite directions from center section 85. Left and right boom arms 87, 89 have multiple segments with pairs of primary boom segments 90, secondary boom segments 95, and breakaway boom segments 100 extending in opposite directions along the respective left and right boom arms 87, 89 mirrored about a longitudinal axis of the sprayer 15.

To ensure proper coverage of an agricultural field, the sprayer 15 also includes rear wheel nozzles 102 arranged with respect to the rear wheels. In operation, the pump 61 can also push either liquid product 50 or rinse liquid 54 through plumbing components to the rear wheel nozzles 102 for release out of the rear wheel nozzles 102 to areas behind the rear wheels. Each of the rear wheel nozzles 102 can be selectively activated or deactivated as desired during spraying or rinsing operations of sprayer 15. The rear wheel nozzles 102 can be arranged with respect to rear wheel fenders 104 disposed over the rear wheels, so that the rear wheel nozzles 102 adjust inwardly and outwardly with the rear wheels. In one aspect, one rear wheel nozzle 102 can be arranged with respect to each rear wheel fender 104. However, another aspect, multiple rear wheel nozzles 102 can be arranged with respect to each rear wheel fender 104.

Figure 2:
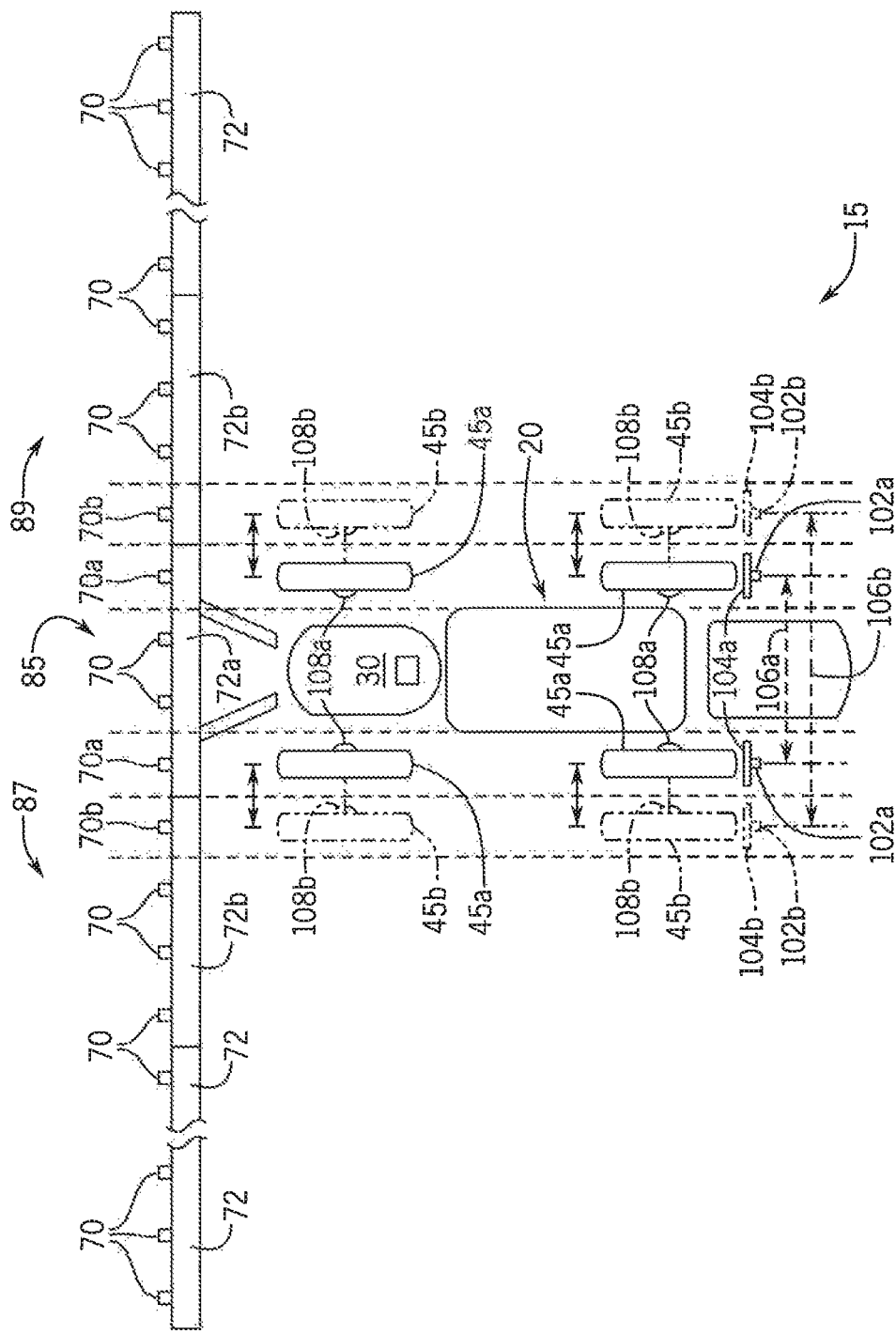
FIG. 2 is a schematic plan view of the self-propelled sprayer of FIG. 1.

Referring now to FIG. 2, in a schematic plan view of the sprayer 15, the wheels 45 are shown in exemplar first and second wheel states 45a and 45b, respectively. In the first wheel state 45a, the wheels 45 are moved inwardly with respect to the chassis 20. However, in the second wheel state 45b, also shown in phantom lines, the wheels 45 are moved outwardly with respect to the chassis 20. The wheels 45 can moved by the operator in a continuous range between the first and second wheel states 45a and 45b, respectively, as desired, such as depending on widths of rows of an agricultural field. In the first wheel state 45a, the wheels 45 are separated to define a first separation distance 106a. However, in the second wheel state 45b, the wheels 45 are separated to define a second separation distance 106b. Thus, the first and second separation distances 106a and 106b, respectively, are variable depending on the configured tread width of the wheels 45. In addition, the variable separation distance can be monitored by one or more wheel sensors 108, such as a telescoping electronic linear measurement instrument, affixed in relation to one or more of the wheels 45.

Figure 3:
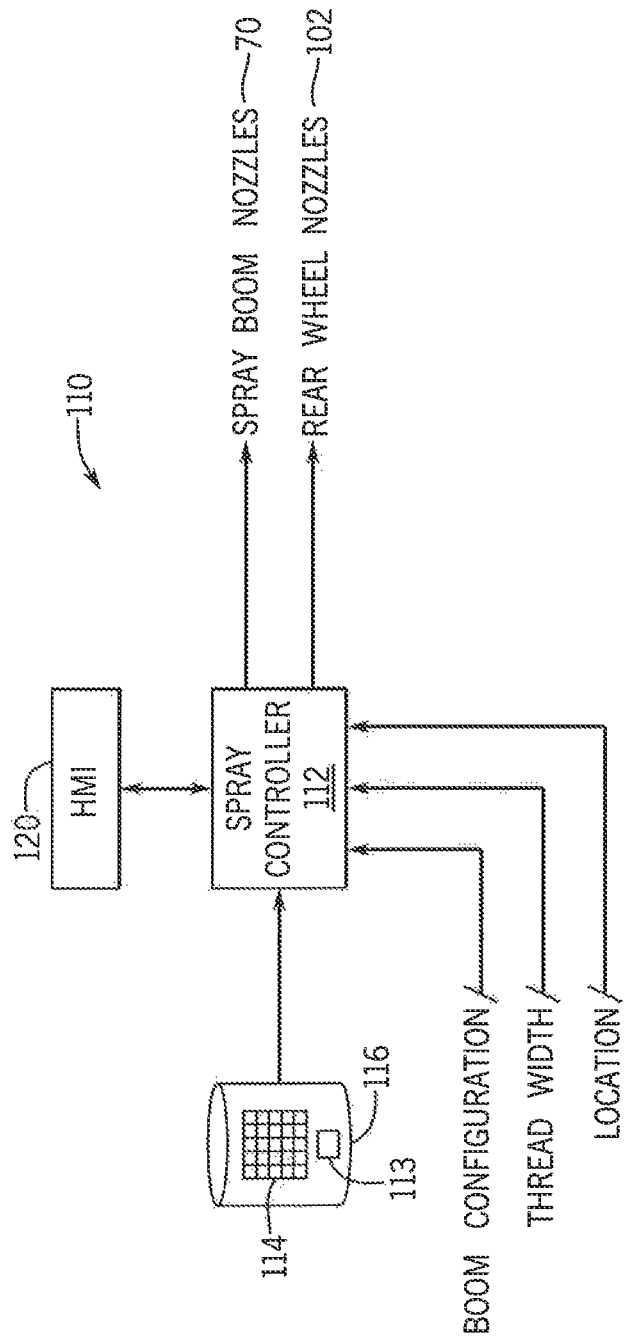
FIG. 3 is a simplified control system for implementing the spray system of FIGS. 1 and 2 in accordance with aspect of the invention.

With additional reference to FIG. 3, a simplified control system 110 for implementing the spray system of FIGS. 1 and 2 is provided in accordance with aspect of the invention. In the control system 110, a spray controller 112 can be configured to execute a control program 113 to control activation and deactivation of the spray boom nozzles 70 and the rear wheel nozzles 102 as desired. The control system 110 can control activation and deactivation of the spray boom nozzles 70 and the rear wheel nozzles 102 individually, with "per-nozzle" control, and/or according to sections 72 having the spray boom nozzles 70 and/or aligning with the rear wheel nozzles 102. The spray controller 112 can receive a variety of inputs for accomplishing such control in the system, including: (1) a prescription map 114; (2) a configuration of the spray boom 17; (3) a variable separation distance 106 or tread width of the wheels 45; and/or (4) a current location of the sprayer 15.

The prescription map 114 may be a liquid product delivery plan for an agricultural field which indicates areas of the field, types and/or amounts of liquid product, and the like, for treating the field, based on coordinate locations. The prescription map 114 can be stored in a data structure 116 in communication with the spray controller 112. The configuration of the spray boom 17 can be manually provided by an operator in the cab 30. Alternatively, the configuration of the spray boom 17 could be detected based on autosensing logic implemented in the center section 85 upon connection to the spray boom 17. The configuration of the spray boom 17 can include parameters indicating one or more of: presence of the spray boom 17; length of the spray boom 17; arrangement of the sections 72; number of spray boom nozzles 70; distances between spray boom nozzles 70; assignment of spray boom nozzles 70 to sections 72; and so forth. The variable separation distance 106 or tread width of the wheels 45 can be manually provided by an operator in the cab 30. Alternatively, the variable separation distance 106 could be detected by the one or more wheel sensors 108. The current location of the sprayer 15 can be detected using a Global Positioning System (UPS) antenna 118 (FIG. 1) and/or other location service.

In addition, the spray controller 112 can be in communication with a Human Machine Interface (HMI) 120 in the cab 30. The HMI 120 can also be used to provide the aforementioned inputs to the spray controller 112 by an operator, such as: loading the prescription map 114; setting the configuration of the spray boom 17; setting the variable separation distance 106 or tread width of the wheels 45; and/or configuring an input source for the current location of the sprayer 15.

In operation, the spray controller 112, under control of the operator, can load the prescription map 114 for an agricultural field for delivering the liquid product 50. The spray controller 112 can then continuously determine current locations of the sprayer 15 with respect to the prescription map 114. Based on positions of the spray boom nozzles 70 (for per-nozzle control), the spray controller 112 can activate or deactivate individual spray boom nozzles 70, and rear wheel nozzles 102, according to the locations of the spray boom nozzles 70 of the sprayer 15 with respect to the prescription map 114. In addition, or alternatively, based on positions of the sections 72 (for sectional control), the spray controller 112 can activate or deactivate groups of spray boom nozzles 70 in sections 72, and rear wheel nozzles 102, according to the location of the sections 72 of the sprayer 15 with respect to the prescription map 114.

In one aspect, the spray controller 112 can control the rear wheel nozzles 102 by first determining spray boom nozzles 70 that are aligned with the rear wheel nozzles 102 within a threshold ("counterpart spray boom nozzles"), then mirroring the rear wheel nozzles 102 to follow the activation/deactivation states of those spray boom nozzles 70 (the counterpart spray boom nozzles). This can be accomplished by the spray controller 112 comparing the variable separation distance 106 to the configuration of the spray boom 17. For example, referring again to FIG. 2, in a per-nozzle control system, in the first wheel state 45*a*, the spray controller 112 can compare the first separation distance 106*a* to the configuration of the spray boom 17 to determine that spray boom nozzles 70*a* are aligned with the rear wheel nozzles 102*a* as counterpart spray boom nozzles. The spray controller 112 can then mirror the rear wheel nozzles 102*a* to follow the activation/deactivation states of the spray boom nozzles 70*a* according to the locations of the spray boom nozzles 70*a* with respect to the prescription map 114. Then, upon an increase of tread width to the second wheel state 45*b*, the spray controller 112 can compare the second separation distance 106*b* to the configuration of the spray boom 17 to determine that spray boom nozzles 70*b* are aligned with the rear wheel nozzles 102*b* as counterpart spray boom nozzles. The spray controller 112 can then mirror the rear wheel nozzles 102*b* to follow the activation/deactivation states of the spray boom nozzles 70*b* according to the locations of the spray boom nozzles 70*b* with respect to the prescription map 114. Accordingly, the spray controller 112 can activate the rear wheel nozzles 102 during periods of activation determined for spray boom nozzles 70 aligned with the rear wheel nozzles 102.

Similarly, in a sectional control system, in the first wheel state 45*a*, the spray controller 112 can the compare first separation distance 106*a* to the configuration of the spray boom 17 to determine the inner section 72*a* that is aligned with the rear wheel nozzles 102*a* as counterpart spray boom sections. The spray controller 112 can then mirror the rear wheel nozzles 102*a* to follow the activation/deactivation states of the inner section 72*a* according to the location of the inner section 72*a* with respect to the prescription map 114. Then, upon an increase of tread width to the second wheel state 45*b*, the spray controller 112 can compare the second separation distance 106*b* to the configuration of the spray boom 17 to determine that spray boom nozzles 70*b* are aligned with outer sections 72*b* as counterpart spray boom sections. The spray controller 112 can then mirror the rear wheel nozzles 102*b* to follow the activation/deactivation states of the outer sections 72*b* according to the locations of the outer sections 72*b* with respect to the prescription map 114. Accordingly, the spray controller 112 can also activate the rear wheel nozzles 102 during periods of activation determined for sections 72 aligned with the rear wheel nozzles 102.

In addition, to conserve the liquid product 50, the spray controller 112 can deactivate the spray boom nozzles 70 and/or sections 72 aligned with the rear wheel nozzles 102 when the rear wheel nozzles 102 are activated. For example, in the first wheel state 45*a*, the spray controller 112 can deactivate the spray boom nozzles 70*a* or the inner section 72*a* when the rear wheel nozzles 102 are activated. Then, in the second wheel state 45*b*, the spray controller 112 can deactivate the spray boom nozzles 70*b* or the outer section 72*b* when the rear wheel nozzles 102 are activated.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A spray system for a self-propelled agricultural machine, the spray system comprising:
    a chassis supported by a plurality of wheels, wherein rear wheels of the plurality of wheels are configured to adjust inwardly and outwardly with respect to the chassis to define a variable separation distance between the rear wheels;
    a spray boom supported by the chassis, the spray boom comprising a plurality of spray boom nozzles positioned forwardly of the rear wheels during a spraying operation and configured to selectively deliver a liquid product to an agricultural field;
    a plurality of rear wheel nozzles arranged with respect to the rear wheels, the rear wheel nozzles being configured to selectively deliver a liquid product to an agricultural field in an area rearwardly of the rear wheels; and
    a controller configured to control activation and deactivation of the spray boom nozzles and the rear wheel nozzles, the controller executing a program stored in a non-transient medium to:
    load a prescription map indicating areas of an agricultural field for delivering a liquid product;
    determine a location of the machine with respect to the prescription map; and
    selectively activate or deactivate spray boom nozzles and rear wheel nozzles in response to the location of the machine with respect to the prescription map and the variable separation distance between the rear wheels.

2. The spray system of claim 1, further comprising the controller executing the program to determine spray boom nozzles aligned with the rear wheel nozzles according to the variable separation distance.

3. The spray system of claim 2, further comprising the controller executing the program to activate the rear wheel nozzles during periods of activation determined for the spray boom nozzles aligned with the rear wheel nozzles.

4. The spray system of claim 2, further comprising the controller executing the program to deactivate the spray boom nozzles aligned with the rear wheel nozzles when the rear wheel nozzles are activated.

5. The spray system of claim 1, wherein the spray boom nozzles are arranged in a plurality of sections disposed on the spray boom, and further comprising the controller executing the program to activate the rear wheel nozzles during periods of activation determined for sections aligned with the rear wheel nozzles.

6. The spray system of claim 1, wherein the rear wheel nozzles are arranged with respect to fenders disposed over the rear wheels.

7. The spray system of claim 1, wherein the rear wheels include first and second rear wheels and the plurality of rear wheel nozzles include first and second pluralities of rear wheel nozzles, and wherein the first plurality of rear wheel nozzles is arranged with respect to the first rear wheel and the second plurality of rear wheel nozzles is arranged with respect to the second rear wheel.

8. The spray system of claim 1, further comprising a Human Machine Interface (HMI) in communication with the controller, wherein the variable separation distance is provided by an operator through the HMI.

9. The spray system of claim 1, further comprising a sensor disposed with respect to the rear wheels, the sensor being in communication with the controller, wherein the variable separation distance is provided by the sensor to the controller.

10. A method for spraying an agricultural field using a self-propelled agricultural machine having a chassis supported by a plurality of wheels, the plurality of wheels including forward wheels and rear wheels, the method comprising:
    positioning spray boom nozzles forwardly of the rear wheels during a spraying operation;
    adjusting rear wheels of the plurality of wheels inwardly or outwardly with respect to the chassis to define a variable separation distance between the rear wheels;
    loading a prescription map indicating areas of an agricultural field for delivering a liquid product;
    determining a location of the machine with respect to the prescription map;
    selectively activating or deactivating spray boom nozzles arranged with respect to a spray boom supported by the chassis in response to the location of the machine with respect to the prescription map and the variable separation distance between the rear wheels, wherein the spray boom nozzles are configured to deliver a liquid product to an agricultural field; and
    selectively activating or deactivating rear wheel nozzles arranged with respect to the rear wheels in response to the location of the machine with respect to the prescription map and the variable separation distance between the rear wheels, wherein the rear wheel nozzles are configured to deliver a liquid product to an agricultural field in an area rearwardly of the rear wheels.

11. The method of claim 10, further comprising determining spray boom nozzles aligned with the rear wheel nozzles according to the variable separation distance.

12. The method of claim 11, further comprising activating the rear wheel nozzles during periods of activation determined for the spray boom nozzles aligned with the rear wheel nozzles.

13. The method of claim 11, further comprising the deactivating the spray boom nozzles aligned with the rear wheel nozzles when the rear wheel nozzles are activated.

14. The method of claim 10, wherein the spray boom nozzles are arranged in a plurality of sections disposed on the spray boom, and further comprising activating the rear wheel nozzles during periods of activation determined for sections aligned with the rear wheel nozzles.

15. The method of claim 10, wherein the rear wheel nozzles are arranged with respect to fenders disposed over the rear wheels.

16. The method of claim 10, wherein the rear wheels include first and second rear wheels and the plurality of rear wheel nozzles include first and second pluralities of rear wheel nozzles, and wherein the first plurality of rear wheel nozzles is arranged with respect to the first rear wheel and the second plurality of rear wheel nozzles is arranged with respect to the second rear wheel.

17. The method of claim 10, further comprising providing the variable separation distance from a Human Machine Interface (HMI).

18. The method of claim 10, further comprising providing the variable separation distance from a sensor disposed with respect to the rear wheels.

19. A spray system for a self-propelled agricultural machine, the spray system comprising:
- a chassis supported by a plurality of wheels, wherein rear wheels of the plurality of wheels are configured to adjust inwardly and outwardly with respect to the chassis to define a variable separation distance between the rear wheels;
- a spray boom supported by the chassis, the spray boom including a plurality of spray boom nozzles positioned forwardly of the rear wheels during a spraying operation and configured to selectively deliver a liquid product to an agricultural field;
- a plurality of rear wheel nozzles arranged with respect to the rear wheels, the rear wheel nozzles being configured to selectively deliver a liquid product to the agricultural field in an area rearwardly of the rear wheels; and
- a controller configured to selectively control activation and deactivation of the spray boom nozzles and the rear wheel nozzles in response to a location of the machine in the agricultural field and the variable separation distance between the rear wheels.

20. The spray system of claim 19 wherein at least one of the plurality of rear wheel nozzles lies along a common axis with a corresponding first of the plurality of spray boom nozzles with the real wheels in an inward position with respect to the chassis and lies along a common axis with a corresponding second of the plurality of spray boom nozzles with the real wheels in an outward position with respect to the chassis.

* * * * *